(12) United States Patent
Fisker

(10) Patent No.: US 12,426,998 B2
(45) Date of Patent: *Sep. 30, 2025

(54) SNAPPING OF DENTURE TEETH

(71) Applicant: 3SHAPE A/S, Copenhagen (DK)

(72) Inventor: Rune Fisker, Virum (DK)

(73) Assignee: 3SHAPE A/S, Kobenhavn K (DK)

( * ) Notice: Subject to any disclaimer, the term of this patent is extended or adjusted under 35 U.S.C. 154(b) by 161 days.

This patent is subject to a terminal disclaimer.

(21) Appl. No.: 17/332,412

(22) Filed: May 27, 2021

(65) Prior Publication Data

US 2021/0282905 A1 Sep. 16, 2021

Related U.S. Application Data

(63) Continuation of application No. 15/103,082, filed as application No. PCT/EP2014/078832 on Dec. 19, 2014, now Pat. No. 11,083,550.

(30) Foreign Application Priority Data

Dec. 20, 2013 (DK) .......................... PA 2013 70802

(51) Int. Cl.
*A61C 9/00* (2006.01)
*A61C 11/00* (2006.01)
(Continued)

(52) U.S. Cl.
CPC .......... *A61C 9/004* (2013.01); *A61C 13/0004* (2013.01); *A61C 13/34* (2013.01); *A61C 11/00* (2013.01)

(58) Field of Classification Search
CPC ..... A61C 13/34; A61C 13/0004; A61C 9/004; A61C 11/00
See application file for complete search history.

(56) References Cited

U.S. PATENT DOCUMENTS

2002/0072027 A1* 6/2002 Chishti .................... A61C 7/00
433/24
2004/0219490 A1 11/2004 Gartner et al.
(Continued)

FOREIGN PATENT DOCUMENTS

JP H09238959 A 9/1997
WO 2008051130 A1 5/2008
(Continued)

OTHER PUBLICATIONS

International Search Report (PCT/ISA/210) mailed on Mar. 17, 2015, by the European Patent Office as the International Searching Authority for International Application No. PCT/EP2014/078832.
(Continued)

*Primary Examiner* — Thomas C Barrett
*Assistant Examiner* — Shannel Nicole Belk
(74) *Attorney, Agent, or Firm* — Buchanan Ingersoll & Rooney PC

(57) ABSTRACT

A method for digitally designing a denture for a patient, where the denture includes a plurality of denture teeth, where designing the denture includes transforming denture teeth of the denture, wherein the method includes obtaining a 3D scan of the upper jaw and lower jaw of the patient; obtaining a digital 3D arrangement of the denture teeth, where the denture teeth are pre-set in occlusion; digitally arranging the 3D scan of the upper jaw and lower jaw relative to the 3D arrangement of the denture teeth; digitally grouping the denture teeth in four groups, the four groups includes an upper anterior group, a lower anterior group, a left posterior group, and a right posterior group; and digitally arranging the upper anterior group first, the left and right posterior groups second and the lower anterior group third.

12 Claims, 8 Drawing Sheets

(51) Int. Cl.
*A61C 13/00* (2006.01)
*A61C 13/34* (2006.01)

(56) References Cited

U.S. PATENT DOCUMENTS

| | | |
|---|---|---|
| 2010/0145898 A1 | 6/2010 | Malfliet et al. |
| 2012/0015321 A1 | 1/2012 | Moriyama et al. |
| 2012/0095732 A1 | 4/2012 | Fisker et al. |
| 2012/0179281 A1 | 7/2012 | Steingart et al. |

FOREIGN PATENT DOCUMENTS

| | | |
|---|---|---|
| WO | 2008051774 A1 | 5/2008 |
| WO | 2012041329 A1 | 4/2012 |
| WO | 2013079437 A2 | 6/2013 |
| WO | 2013120955 A1 | 8/2013 |
| WO | 2013186315 A2 | 12/2013 |

OTHER PUBLICATIONS

Written Opinion (PCT/ISA/237) mailed on Mar. 17, 2015, by the European Patent Office as the International Searching Authority for International Application No. PCT/EP2014/078832.
European Search Report issued in corresponding European Patent Application No. 21 1841 425.3, dated Jan. 14, 2022 (9 pages).

\* cited by examiner

SNAPPING OF DENTURE TEETH

CROSS-REFERENCE TO RELATED APPLICATIONS

The present application is a continuation of U.S. patent application Ser. No. 15/103,082, which is a national stage application of PCT/EP2014/078832, filed on Dec. 19, 2014, and which claims the priority of Denmark Patent Application No. PA 2013 70802, which was filed on Dec. 20, 2013. U.S. patent application Ser. No. 15/103,082; PCT/EP2014/078832 and Denmark Patent Application No. PA 2013 70802 are all incorporated herein by reference.

FIELD OF THE INVENTION

This invention generally relates to a method, a system and a virtual environment for virtually/digitally designing a denture for a patient, where the denture comprises a plurality of denture teeth. More particularly, the invention relates to designing the denture by transforming, such as relocating, repositioning and/or rotating, denture teeth of the denture.

BACKGROUND OF THE INVENTION

3Shape's WO12041329A1 discloses is a method for modeling and manufacturing a denture for a patient, where the denture comprises a gingival part and artificial teeth, wherein the method comprises: providing a 3D scan comprising at least part of the patient's oral cavity; virtually modeling at least part of the denture using the 3D scan; obtaining virtual teeth to represent the artificial teeth; virtually modeling at least one of the virtual teeth to obtain a set of modeled virtual teeth; manufacturing the modeled virtual teeth in a first material; manufacturing the gingival part in a second material; and manufacturing at least part of the denture by means of computer aided manufacturing (CAM).

3Shape's WO13120955A1 discloses a method for modeling a digital design of a denture for a patient, said denture comprising a gingival part and a teeth part comprising a set of denture teeth, where the method comprises: —obtaining a digital 3D representation of the patient's gum; —obtaining virtual teeth models corresponding to the denture teeth; —virtually arranging the virtual teeth models in relation to the digital 3D representation of the patient's gum; and —generating a virtual outer gingival surface of the gingival part of the denture.

It remains a problem to improve the virtual designing of the denture.

SUMMARY

Disclosed is a method for digitally designing a denture for a patient, where the denture comprises a plurality of denture teeth, where designing the denture comprises transforming, such as relocating, repositioning and/or rotating, denture teeth of the denture, and where the denture teeth are grouped in at least two blocks where each block comprises at least two denture teeth, wherein the method comprises:
 obtaining a 3D scan of the upper jaw and lower jaw of the patient;
 obtaining a digital 3D arrangement of the denture teeth, where the denture teeth are pre-set in occlusion;
 digitally arranging the 3D scan of the upper jaw and lower jaw relative to the 3D arrangement of the denture teeth;
 digitally transforming at least one denture tooth based on input from a user;
 where at least one design rule is enforced that affect one or more, but not all of the blocks, when the at least one denture tooth is transformed.

In order to provide a desired dental setup for a denture it is important to consider both the esthetic and functional design of the denture. Each tooth may be setup in a desired way in order to obtain such desired dental setup. However, designing a denture one tooth at a time takes considerable time and even when doing so a tooth transformation may undesirably affect a previous tooth transformation.

Accordingly, by grouping the teeth in blocks and applying design rules for each block that is enforced automatically, e.g. by a computer, during design important functional or esthetic rules for that specific block may be maintained during design and ensure that the desired dental setup is obtained in a quick and correct manner.

The design rules are typically enforced digitally, e.g. by a computer processor. In this way, no matter the transformation done by the user the design rules will be enforced. This may lead to situation where the users attempts to transform a denture tooth in a particular way but is prevented in doing so since the enforcement of the design rule will prevent and override the transformation.

The method is advantageous for edentulous patients, i.e. patient's having no teeth, since a whole set of denture teeth is arranged here. The method may also be used for patients still having some teeth left in the mouth, in this case the areas in the patient's mouth where more denture teeth should be placed, will benefit from being designed using the method.

In this application the term denture tooth or denture teeth will primarily be used, but the terms tooth or teeth may also be used to describe denture tooth or denture teeth.

The term neighbor teeth may be used to describe the neighbor denture teeth for the transformed, repositioned denture tooth. The neighbor teeth may be the nearest neighbor teeth, e.g. the two denture teeth proximal to the denture tooth in question, and/or one denture tooth proximal to the denture tooth in question, and/or more denture teeth than just the ones right next to the denture tooth in question.

Thus the neighbor teeth may be defined as the one or two nearest neighbor teeth proximal to the relocated/repositioned denture tooth or as a number of neighbor teeth positioned distally and mesially relative to the repositioned/relocated tooth.

The term transforming is used in this application to describe repositioning, relocation, movement and/or rotation of denture tooth. Thus the term transforming is not used to describe modeling, morphing, change of shape, form, size etc. of a denture tooth, since the denture teeth will typically be pre-manufactured and thus changing the shape of the individual denture teeth may not be advantageous.

The 3D scan of the patient's upper and lower jaw may be used to arrange the 3D arrangement of the denture teeth correctly. The 3D scan of the upper and lower jaws may be performed by a dentist scanning the patient with an intra oral scanner, such as 3Shape's TRIOS scanner. Alternatively, the 3D scan may be performed by scanning a physical impression of the patient's upper and lower jaw, where the scanning can be performed in a desktop 3D scanner, such as 3Shape's D900 scanner or corresponding desktop scanner, or using 3Shape's TRIOS scanner. A dentist may take the physical impression in the patient's mouth using impression material.

The virtual 3D arrangement of the denture teeth which is pre-set up in occlusion may be selected from a library of virtual 3D arrangements of denture teeth set up in occlusion. Each virtual 3D arrangement of denture teeth in occlusion may have been provided by scanning a physical arrangement of denture teeth in occlusion and saving it in the digital library of the user software for designing the denture.

Snapping:

In some embodiments the repositioned denture tooth is snapped to an adjusted position.

In some embodiments one or more of the neighbor denture teeth is/are snapped to an adjusted position when the denture tooth is repositioned.

Search Algorithm:

In some embodiments the adjusted position of the denture tooth/teeth after transformation/repositioning is determined based on a search optimization algorithm.

In some embodiments the search optimization algorithm is the Golden section search optimization.

In some embodiments the transformation/repositioning/relocation of the denture teeth are restricted to specific directions.

Initial Teeth Placement:

In some embodiments the teeth blocks placement is performed by following arch-shaped mandibular and maxillary alveolar crests in an optimal way and taking into account other anatomical data, such as median, occlusal plane, and/or characteristic points.

In some embodiments the anterior blocks are placed first, and then the posterior blocks are placed, whereby the canines touch the first premolar teeth.

User Interactive Transformations:

In some embodiments the shapes of the anterior blocks are changed by the user performing transformation to any tooth in the anterior blocks.

In one embodiment the design rule is a so-called independent design rule. This is a design rule enforced based on transformations of denture teeth within the same block for which the specific design rule is set up.

Accordingly, the at least one design rule is selected from a group of independent design rules comprising:
 maintain occlusion with antagonist teeth in the block,
 maintain interproximal contact with neighboring teeth in the block.

In another or additional embodiment the design rule is a so-called dependent design rule. This is a design rule which is enforced based on transformations of denture teeth in blocks different from the block for which the design rule is set up.

Accordingly, the at least one design rule is selected from a group of dependent design rules comprising:
 maintain distance between at least one tooth from one block and at least one tooth from another block,
 maintain relative position of at least one tooth from one block with respect to a reference plane or reference line and the relative position of at least one tooth from another block with respect to the reference plane or reference line.

For example, in one embodiment the reference plane is the midplane or midline. Accordingly, if teeth are transformed in one block (e.g. the upper anterior block as described below) that affects the position of the midline a design rule is enforced in another block (e.g. the lower anterior block described below) that ensures that certain teeth in that block follows the midline. In other words the design rule relating to the lower anterior block is dependent on transformations done on teeth in the upper anterior block.

In yet another embodiment the distance between at least one tooth from one block relative to at least one tooth from another block is maintained in order to obtain correct overjet. More specifically the distance between the two central incisors in the upper anterior block as described below and the two central incisors in the lower anterior block also described below is enforced at 2 millimeters when transforming the central incisors in the upper and/or lower anterior block.

Occlusion:

In some embodiments the upper and lower anterior teeth in the virtual 3D arrangement of denture teeth are setup in occlusion separately from each other in arch-shaped blocks.

In some embodiments the denture teeth in the virtual 3D arrangement of denture teeth are split into three logical blocks, which are the upper and lower molars and premolars making a posterior block, an upper anterior teeth block, and a lower anterior teeth block.

Typically there will be 28 denture teeth, thus these 28 denture teeth will be split up into the posterior block, the upper anterior block and the lower anterior block.

In a particular advantageous embodiment the denture teeth are grouped in four blocks, comprising according to the ISO 3950 standard (FDI):
 an upper anterior block comprising teeth 13, 12, 11, 21, 22, 23;
 a lower anterior block comprising teeth 43, 42, 41, 31, 32, 33;
 a left posterior block comprising at least teeth 24, 25, 26, 27, 34, 35, 36, 37; and
 a right posterior block comprising at least teeth 14, 15, 16, 17, 44, 45, 46, 47.

This provides logical blocks that are particularly suited for dental design. For example design rules for the posterior blocks that enforces the occlusion between antagonist teeth can advantageously be provided. Similarly, as described above can a design rule for enforcing the midline for the lower anterior teeth be provided when the central incisors are transformed in the upper anterior block.

In yet another embodiment the sequence wherein the blocks are placed can be advantageous. For example by placing the upper anterior block first the esthetics may be considered. Subsequently placing the left and right posterior blocks ensure correct occlusion of the bite as the molars dominate this function and finally the lower anterior block is placed in order to complete the dental design.

Moreover, design rules may also be set up between blocks. For example, it could be desirable to ensure that neighboring teeth between blocks are kept in interproximal contact. In one embodiment the pre-setup occlusion is maintained regardless of the transformations performed by the user.

In one embodiment the method further comprises:
 defining a predetermined distance between at least a number of neighbor denture teeth;
 providing the predetermined distance between the neighbor denture teeth, when the user digitally repositions a denture tooth in the virtual 3D arrangement of denture teeth.

Consequently, it is an advantage that each tooth movement operation which the user performs triggers an algorithm that ensures that a specified distance between teeth is met. When the user transforms a denture tooth, he may drag the denture tooth to a position different from the current. When the user let go of/release the virtual drag on the denture tooth, the tooth itself and possibly also its neighbor teeth will then snap to a position where the predetermined distance between the teeth are obtained. Thus both the tooth itself and its neighbors may reposition in order to obtain that the distance between them is the predetermined distance.

Thus the predetermined distance between the neighbor teeth is automatically obtained or provided when the user transforms, e.g. relocates a denture tooth.

The purpose of moving and changing the position of a denture tooth may be that the user wishes to change the curvature of the arc of teeth, e.g. to fit the patient's upper and lower jaws better. Or the purpose may be that the patient has specific wishes for how specific denture teeth should be arranged in his new denture, e.g. the patient wishes a specific denture tooth to be positioned in a way that resembles his original teeth.

The denture teeth may remain in occlusion if the position of the teeth are adjusted a little bit. The term distance between the neighbor teeth may mean the distance between the relocated denture tooth and nearest neighbor tooth to one side, and the distance between the relocated denture tooth and its nearest neighbor tooth to the other side, respectively. The nearest neighbor tooth to one side may be termed the denture tooth on the distal surface of the relocated tooth, and the nearest neighbor to the other side may be termed the denture tooth on the mesial surface of the relocated denture tooth. The distance between the nearest neighbor on the distal surface and its nearest neighbor on the distal surface may also be provided as the predetermined distance etc, and likewise for the distance between the nearest neighbor on the mesial surface and its nearest neighbor on the mesial surface etc.

In some embodiments the adjusted position of the repositioned denture tooth is in a distal direction.

In some embodiments the adjusted positions of the repositioned neighbor denture teeth are in a distal direction.

The distal surface of a tooth is the surface away from the median line between the two central teeth, thus the distal direction is the direction away from the median line of the 3D arrangement of denture teeth.

In some embodiments the predetermined distance between the denture teeth is ensured by means of a post-movement operation progressing sequentially tooth by tooth in the distal direction.

In some embodiments if a gap has occurred between two neighbor denture teeth due to the user's performed transformations, the latter tooth is moved mesially thereby closing the gap ensuring that the predetermined distance between the teeth is obtained.

In some embodiments if the current distance between two denture neighbor teeth is less than the predetermined distance, the latter tooth is moved distally.

In some embodiments the shape of the posterior blocks is not adapted to be changed.

In some embodiments the position of the individual teeth in the posterior blocks is not adapted to be changed.

In some embodiments the posterior blocks are adapted to be moved and/or rotated in space.

In some embodiments the pre-setup occlusion is maintained regardless of the transformations performed by the user.

The anterior teeth distance may be maintained by only looking in distal direction starting from the tooth that the user has started to operate on, resulting in controllable gaps.

In some embodiments the distance between anterior blocks and posterior blocks is adapted to be maintained.

In some embodiments the whole posterior block is adapted to be moved distally if space for its placement is needed.

The teeth positions may be sequentially analyzed progressing in distal direction, rather than mesial, whereby a user specified overjet between the upper and lower anterior teeth is configured to be preserved.

In some embodiments posterior blocks with a specific bite type is adapted to be defined separately for the left and for the right side of the mouth.

Distance:

In some embodiments the predetermined distance between the denture teeth is selected from a group consisting of:

the distance is zero, resulting in no distance between the teeth meaning the teeth are arranged with their proximal surfaces touching each other;

the distance is positive, whereby there will be a distance between the teeth, i.e. their proximal surfaces do not touch each other;

the distance is negative, resulting in protrusion, meaning that the teeth will overlap each other.

The distance may for example be 0.2 mm, 0.5 mm, −0.5 mm etc.

The distance may be measured between the points or areas of the denture teeth which are closets to each other.

In another aspect a method for digitally designing a denture for a patient, where the denture comprises a plurality of denture teeth, where designing the denture comprises transforming, such as relocating, repositioning and/or rotating, denture teeth of the denture, wherein the method comprises:

obtaining a 3D scan of the upper jaw and lower jaw of the patient;

obtaining a digital 3D arrangement of the denture teeth, where the denture teeth are pre-set in occlusion;

digitally arranging the 3D scan of the upper jaw and lower jaw relative to the 3D arrangement of the denture teeth;

digitally grouping the denture teeth in four blocks, comprising according to the ISO 3950 standard (FDI):

an upper anterior block comprising teeth 13, 12, 11, 21, 22, 23;

a lower anterior block comprising teeth 43, 42, 41, 31, 32, 33;

a left posterior block comprising at least teeth 24, 25, 26, 27, 34, 35, 36, 37; and a right posterior block comprising at least teeth 14, 15, 16, 17, 44, 45, 46, 47.

digitally placing the upper anterior block first, the left and right posterior blocks second and the lower anterior block third.

As described previously the sequence of placement of the blocks facilitates a quick and good esthetic denture design. As mentioned by placing the upper anterior block first the esthetics may be considered. Subsequently placing the left and right posterior blocks ensure correct occlusion of the bite as the molars dominate this function and finally the lower anterior block is placed in order to complete the dental design.

Wax Rim:

In some embodiments the method further comprises virtually arranging the 3D arrangement of the denture teeth relative to a wax rim of the patient.

In some embodiments the method further comprises virtually snapping the 3D arrangement of the denture teeth to the wax rim.

In some embodiments the position of the 3D arrangement of the denture teeth relative to the wax rim is determined by calculating the minimal distance between a predefined facial/vestibular point on each tooth and the wax rim.

The facial/vestibular point on each denture tooth is defined for each denture tooth, and may be point in the centre of the vestibular surface of each denture tooth.

In some embodiments the method comprises arranging the 3D arrangement of the denture teeth relative to the wax rim with a minimal distance between the facial/vestibular point on each denture tooth and points on the wax rim.

In some embodiments the minimal distance is calculated by means of a minimum distance estimation algorithm.

Real Time:

The algorithm that ensures the specified distance between teeth may be based on a real time collision detection algorithm The calculations of the method may be so heavy that it can not be seen in real time, therefore the calculations may be performed while a copy of the denture teeth is moved having a much lower precision, such that the copy is moved/transformed in real time, but the real transformation is calculated on the real virtual version of the denture teeth, and when this real calculation is done, then the exact finished result can be viewed and used for manufacturing. Thus the real-time mode may be achieved by operating on a simplified representation of teeth models, e.g. decimated models or models having an implicit surface representation.

Computer Implemented:

In some embodiment the method is computer implemented.

The present invention relates to different aspects including the method described above and in the following, and corresponding methods, devices, apparatuses, systems, uses, kits and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a system for virtually/digitally designing a denture for a patient, where the denture comprises a plurality of denture teeth, where designing the denture comprises transforming, such as relocating, repositioning and/or rotating, denture teeth of the denture, and where the denture teeth are grouped in at least two blocks where each block comprises at least two denture teeth, wherein the system comprises:
 means for obtaining a 3D scan of the upper jaw and lower jaw of the patient;
 means for obtaining a digital 3D arrangement of the denture teeth, where the denture teeth are pre-set in occlusion;
 means for digitally arranging the 3D scan of the upper jaw and lower jaw relative to the 3D arrangement of the denture teeth;
 means for digitally transforming at least one denture tooth based on input from a user;
where at least one design rule is enforced that affect one or more, but not all of the blocks, when the at least one denture tooth is transformed.

The method for digitally designing the denture is preferably executed on a computer. E.g. a data storage medium, such as a hard drive, stores computer code, which when executed by a data processor performs one or more of the steps of the method.

For example the step of obtaining the 3D scan of the upper and lower jaw may involve loading a data file from an external data source. However, it may also involve the actual step of scanning.

Similarly, the step of obtaining the digital 3D arrangement may involve loading it from an external data source or from a database, but may also involve the actual step of setting up the digital 3D arrangement The step of digitally transforming the denture tooth typically requires the user to interact with a digital design environment. Accordingly, the computing device comprises an input interface for receiving user input. This can for example be a mouse or a touch screen. In order to visualize the design process and present it to the user and the patient an output interface can be provide. This will typically be a display unit.

The step of enforcing the at least one design rule is preferably done by the processing unit according to a set of requirements as described herein and which typically are stored in a design rule database.

In particular, disclosed herein is a digital design environment for designing a denture for a patient, where the denture comprises a plurality of denture teeth, where designing the denture comprises transforming, such as relocating, repositioning and/or rotating, denture teeth of the denture, and where the denture teeth are grouped in at least two blocks where each block comprises at least two denture teeth, wherein the digital design environment comprises:
 a digital work space adapted for visualizing a 3D scan of the upper jaw and lower jaw of the patient and for visualizing a virtual 3D arrangement of the denture teeth, where the denture teeth are pre-set in occlusion;
 a digital arrangement tool for arranging/providing the 3D scan of the upper jaw and lower jaw relative to the 3D arrangement of the denture teeth;
 a digital transformation tool for digitally transforming at least one denture tooth based on input from a user;
where at least one design rule is enforced that affect one or more, but not all of the blocks, when the at least one denture tooth is transformed.

In some embodiments the digital arrangement tool and the digital transformation tool are provided as virtual buttons.

Such a virtual design environment provides tools for aiding the dental technician in performing the method as described herein. In particular by customizing specific tools to perform specific actions when activated the method is facilitated.

Furthermore, the invention relates to a computer program product comprising program code means for causing a data processing system to perform the method according to any of the embodiments, when said program code means are executed on the data processing system, and a computer program product, comprising a computer-readable medium having stored there on the program code means.

Disclosed is a nontransitory computer readable medium storing thereon a computer program, where said computer program is configured for causing computer-assisted designing of a denture for a patient, where the denture comprises a plurality of denture teeth, where designing the denture comprises transforming, such as relocating, repositioning and/or rotating, denture teeth of the denture.

In some embodiments, the system comprises a nontransitory computer readable medium having one or more computer instructions stored thereon, where said computer instructions comprises instructions for carrying out a method of virtually/digitally designing a denture for a patient, where the denture comprises a plurality of denture teeth, where designing the denture comprises transforming, such as relocating, repositioning and/or rotating, denture teeth of the denture, and where the denture teeth are grouped in at least two blocks where each block comprises at least two denture teeth, wherein the method comprises:

obtaining a 3D scan of the upper jaw and lower jaw of the patient;

obtaining a digital 3D arrangement of the denture teeth, where the denture teeth are pre-set in occlusion;

digitally arranging the 3D scan of the upper jaw and lower jaw relative to the 3D arrangement of the denture teeth;

digitally transforming at least one denture tooth based on input from a user;

where at least one design rule is enforced that affect one or more, but not all of the blocks, when the at least one denture tooth is transformed.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
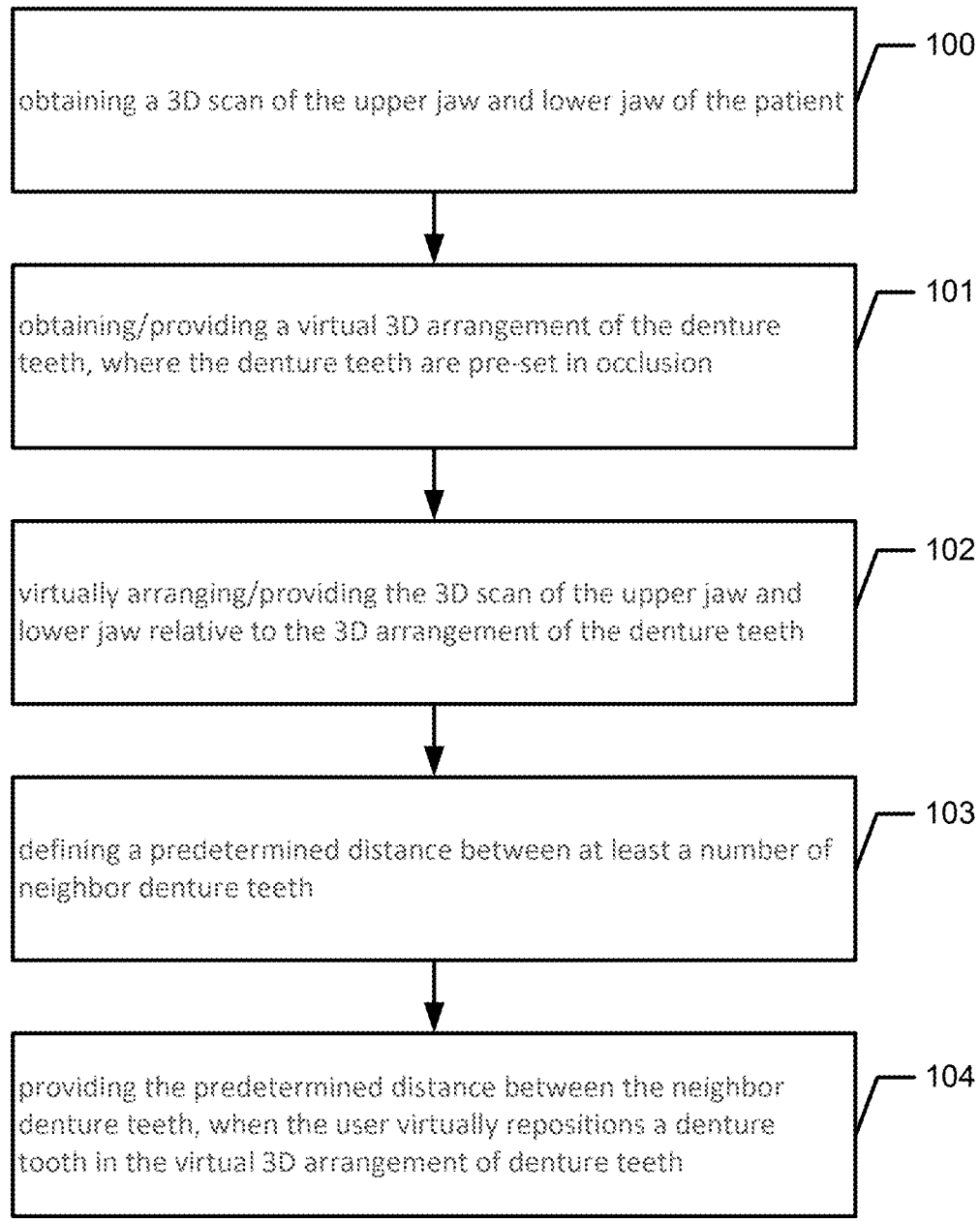
FIG. 1 shows a flow chart of a method for virtually/digitally designing a denture for a patient.

FIG. 1 shows a flow chart of a method for virtually/digitally designing a denture for a patient, where the denture comprises a plurality of denture teeth, where designing the denture comprises transforming, such as relocating, repositioning and/or rotating, denture teeth of the denture.

In step 100 a 3D scan of the upper jaw and lower jaw of the patient is obtained.

In step 101 a virtual 3D arrangement of the denture teeth is obtained or provided, where the denture teeth are pre-set in occlusion.

In step 102 the 3D scan of the upper jaw and lower jaw are virtually arranged or provided relative to the 3D arrangement of the denture teeth.

In step 103 a predetermined distance between at least a number of neighbor denture teeth is defined.

In step 104 the predetermined distance between the neighbor denture teeth is provided, when the user virtually repositions a denture tooth in the virtual 3D arrangement of denture teeth.

FIG. 2 shows an example of transformation of denture teeth.

Figure 2A:
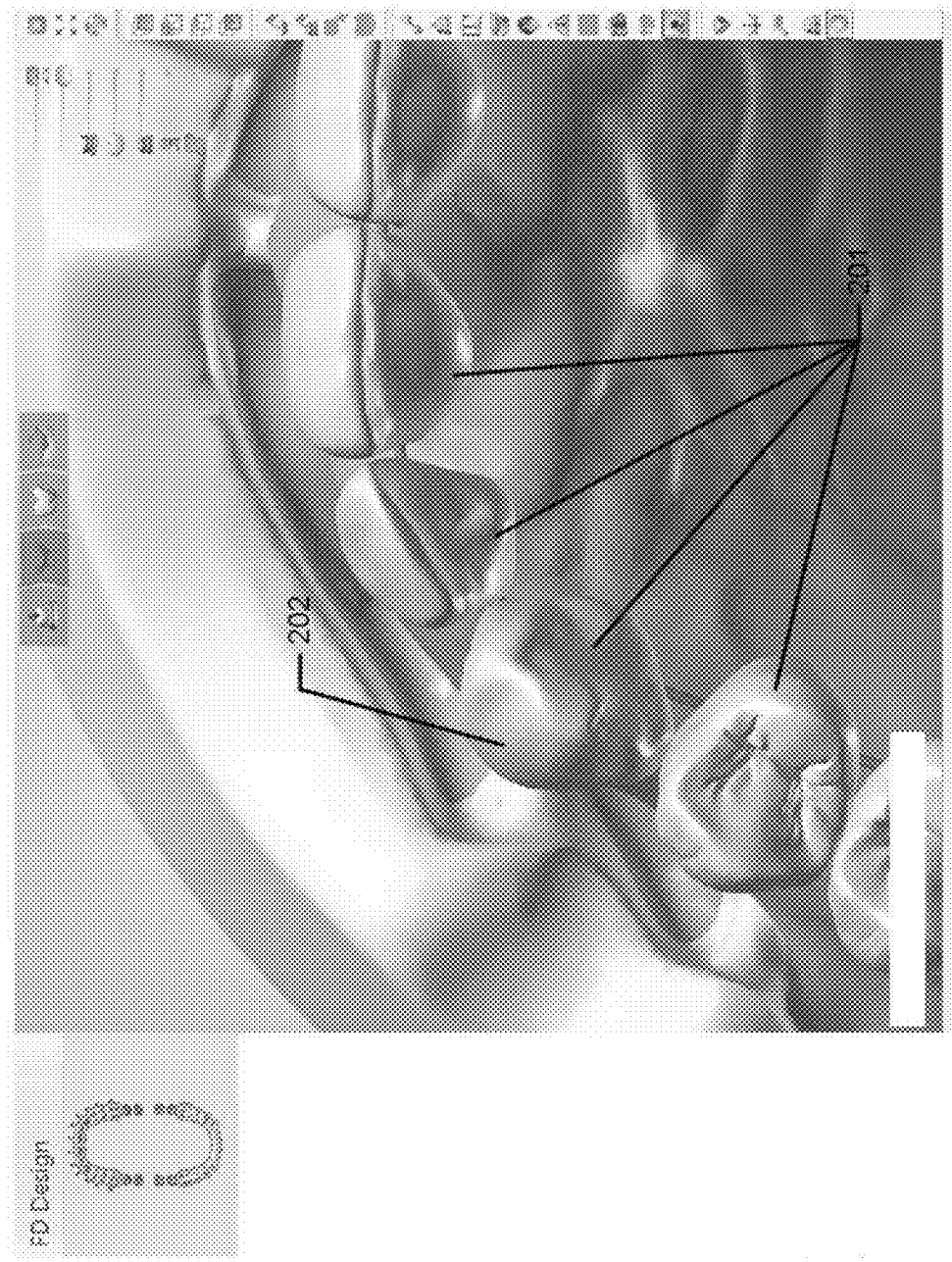
FIGS. 2a to 2c show an example of transformation of denture teeth.

FIG. 2a) shows an example of denture teeth 201 set up in occlusion before a transformation performed by a user. Denture tooth 202 will be transformed as seen in FIG. 2b).

Figure 2B:
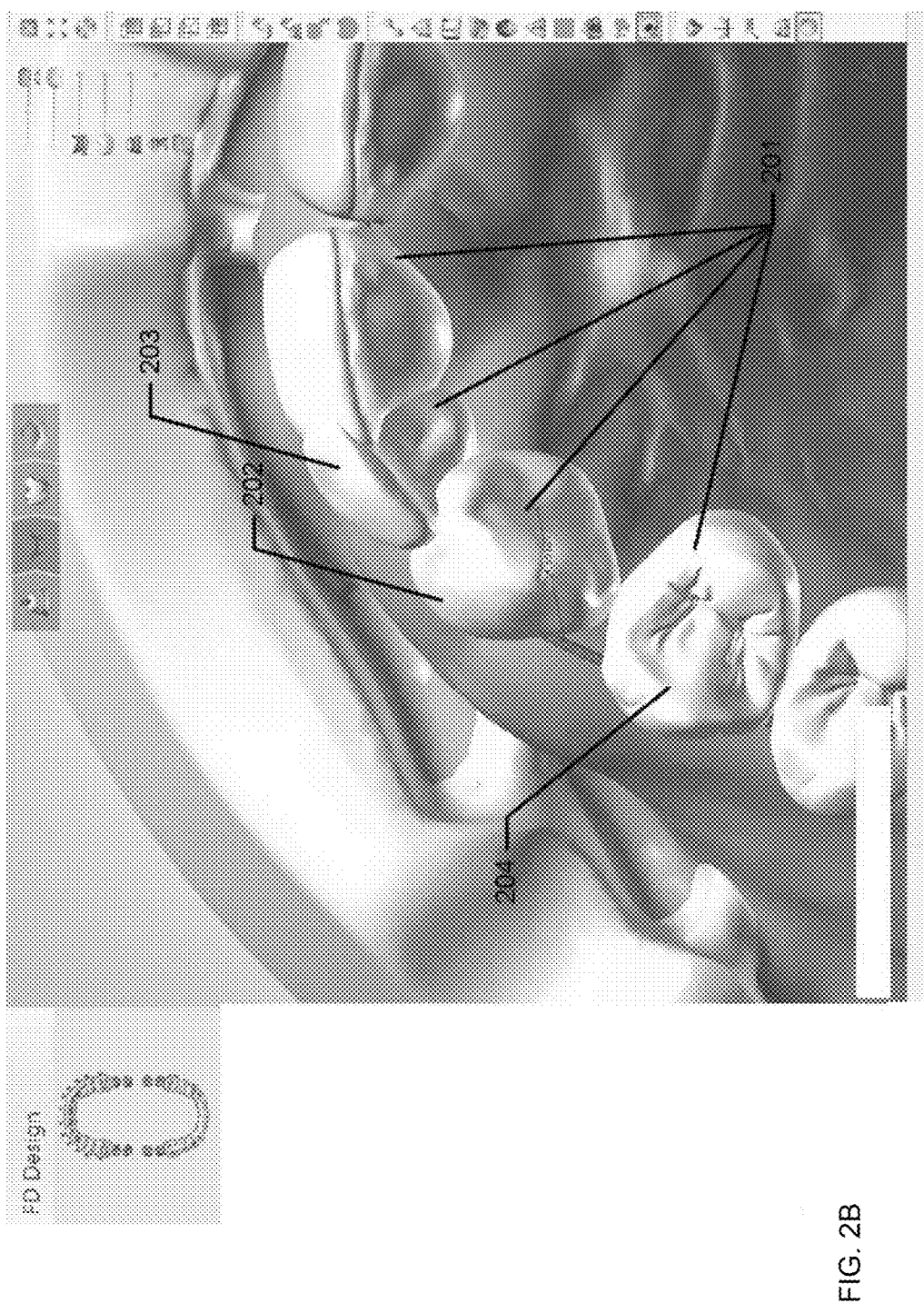

FIG. 2b) shows an example where denture tooth 202 are transformed by the user by the user relocating the denture tooth 202 in a direction by means of a computer mouse. The direction is upwards and to the right in the screenshot. When the user relocates the denture tooth 202, the neighbor denture teeth, e.g. denture tooth 203 and denture tooth 204, are also relocated relative to the relocation of denture tooth 202.

Figure 2C:
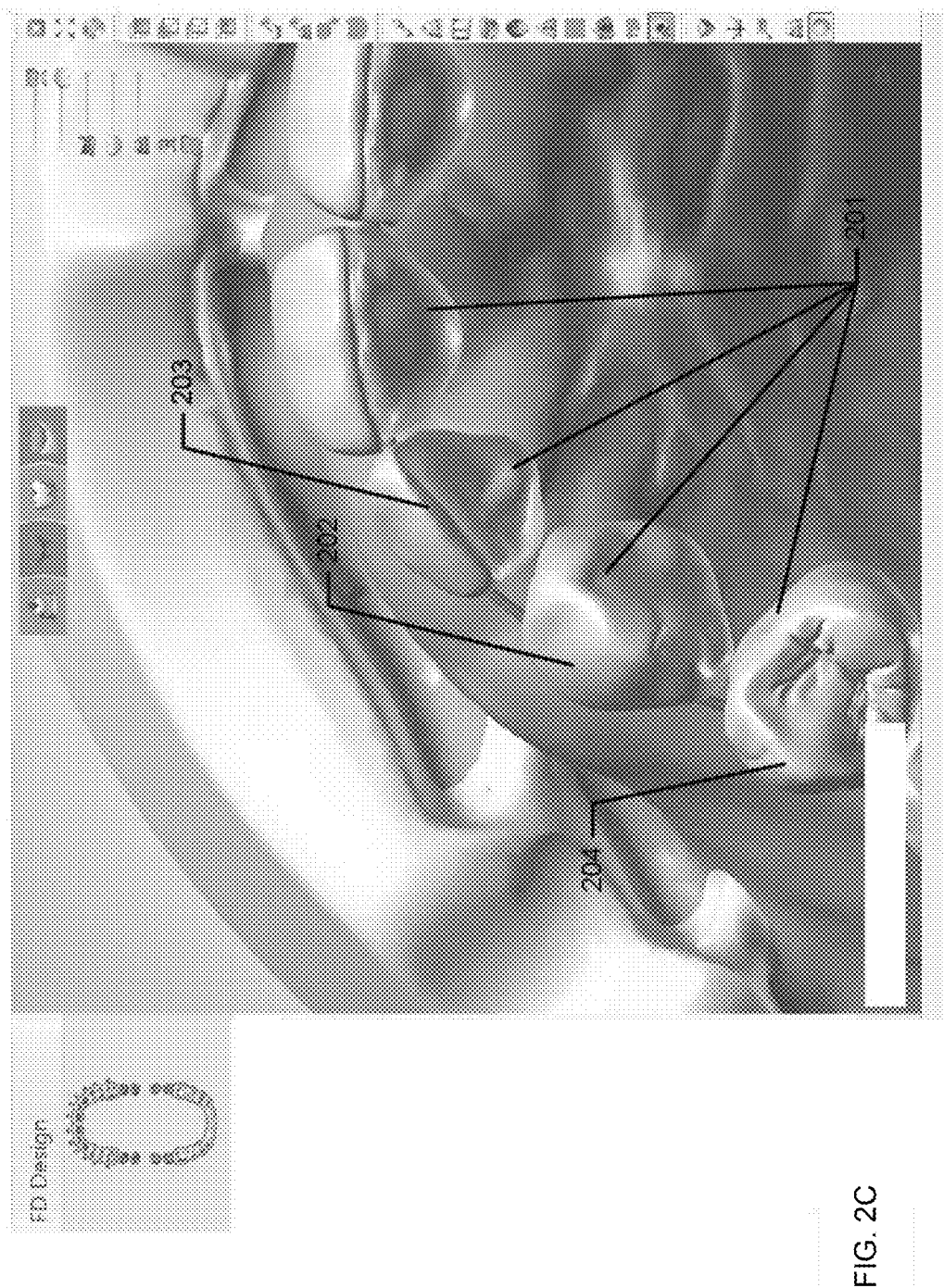

FIG. 2c) shows an example where a predetermined distance between the denture teeth is provided after the user transformation, i.e. the distance between the neighbor denture teeth 202 and 203, and the distance between the neighbor denture teeth 202 and 204, respectively, is now as predetermined.

FIG. 3 shows an example where the 3D arrangement of the denture teeth set up in occlusion are arranged relative to the wax rim.

Figure 3A:
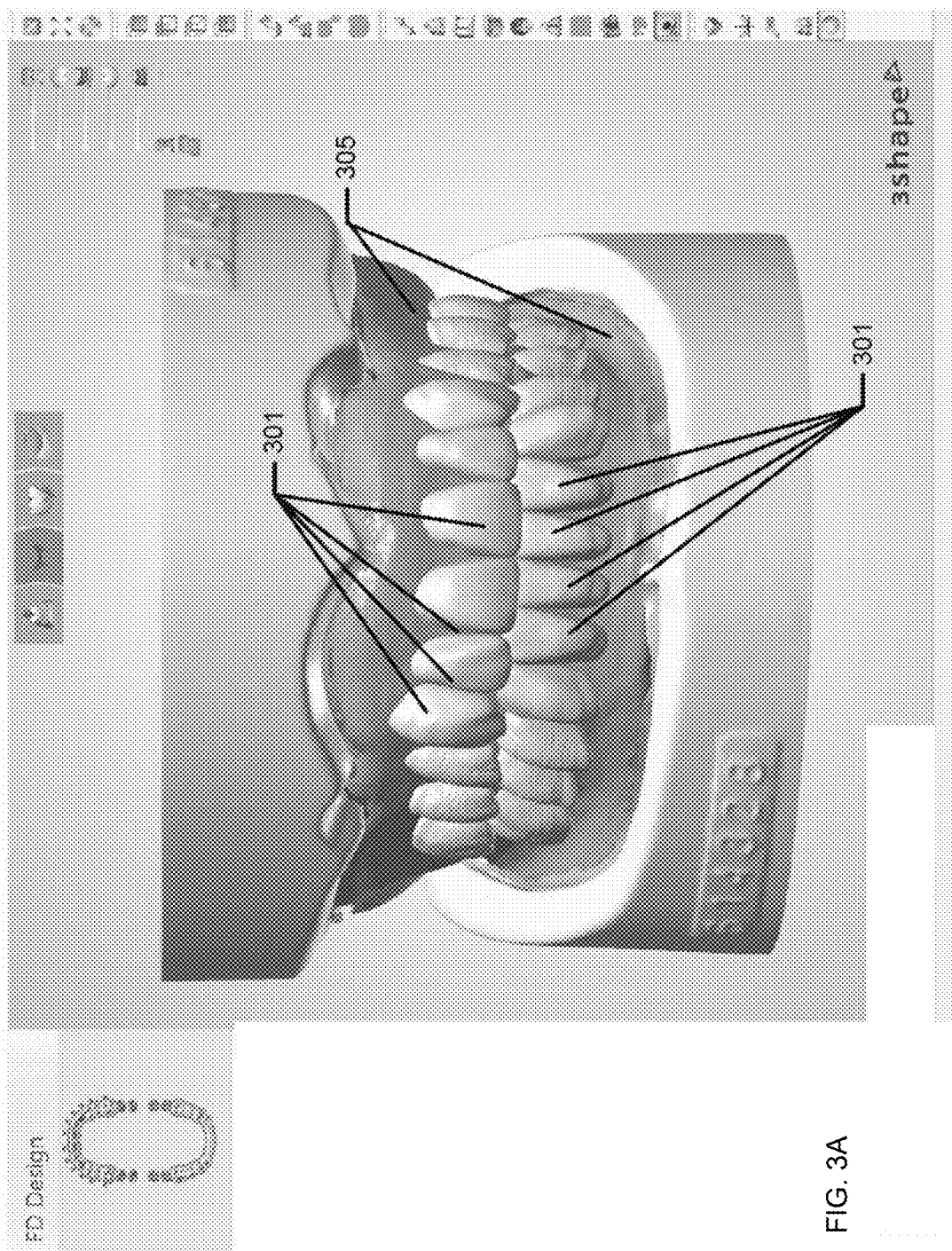
FIGS. 3a and 3b show an example where the 3D arrangement of the denture teeth set up in occlusion are arranged relative to the wax rim.

FIG. 3a) shows an example the 3D arrangement of the denture teeth 301 are virtually arranged relative to a wax rim 305 of the patient.

Figure 3B:
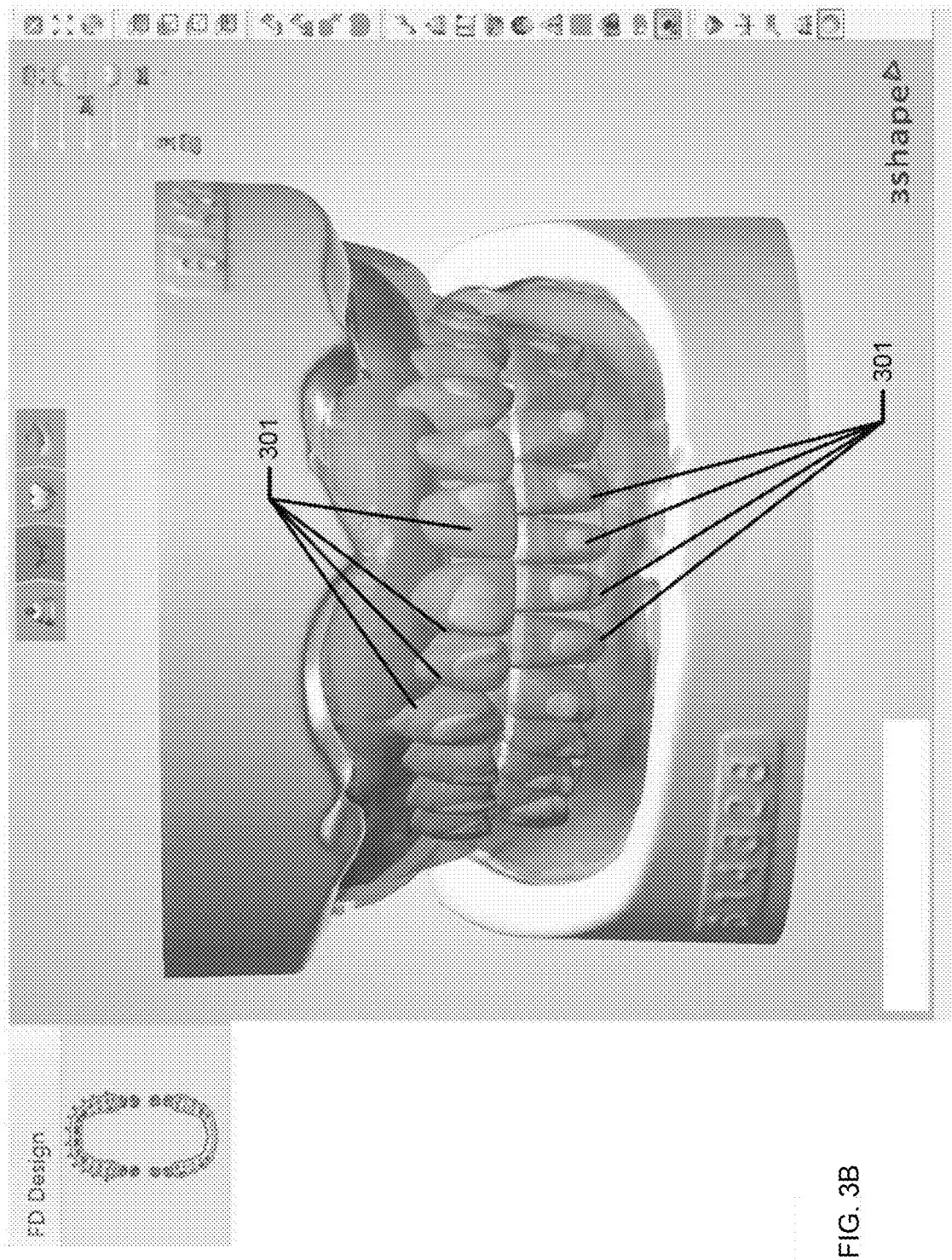

FIG. 3b) shows an example where the 3D arrangement of the denture teeth is arranged relative to the wax rim with a minimal distance between the facial/vestibular point on each denture tooth and points on the wax rim.

Figure 4:
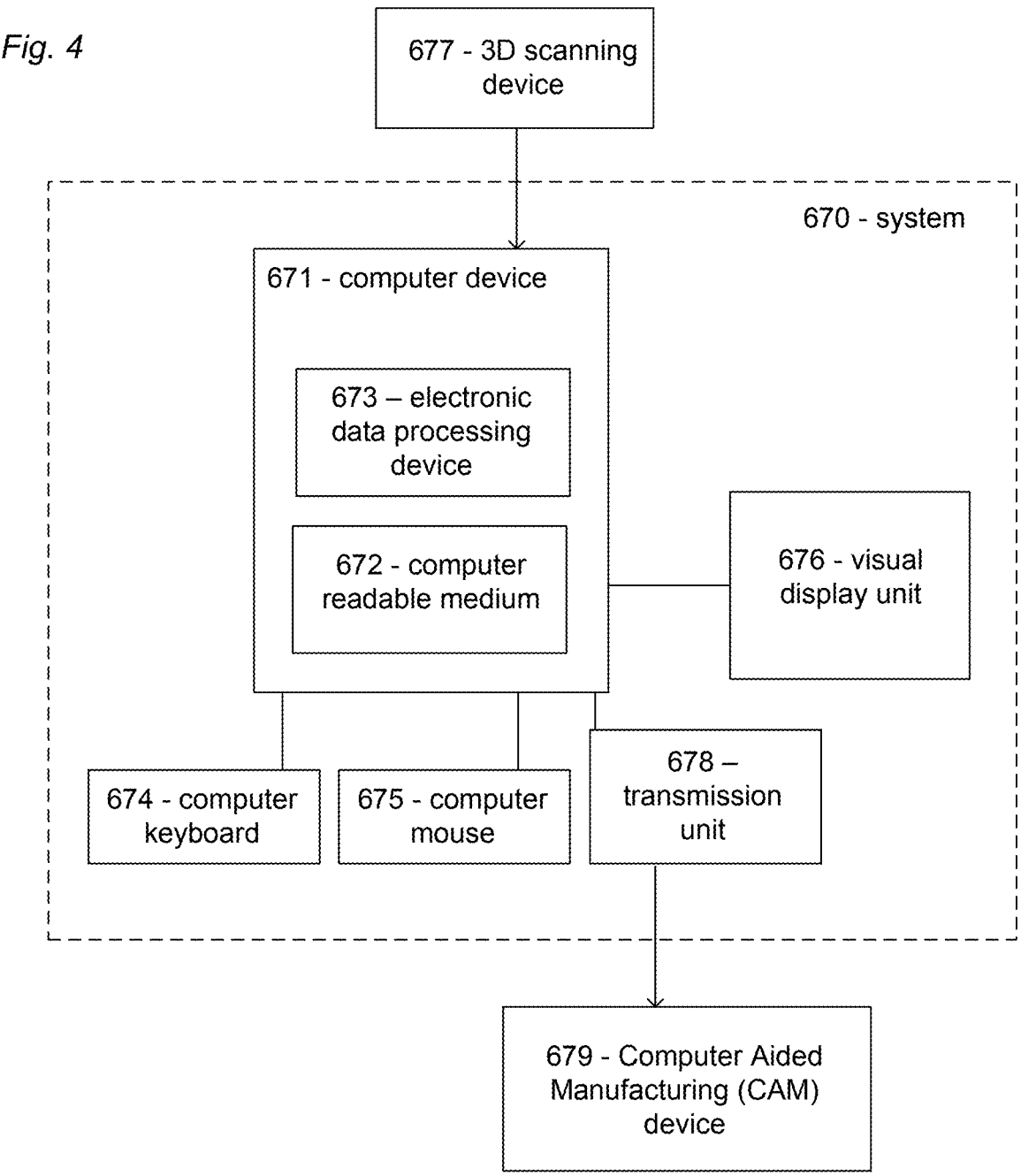
FIG. 4 shows a schematic example of a system according to an embodiment of the invention.

FIG. 4 shows a schematic example of a system according to an embodiment of the invention.

The system 670 comprises a computer device 671 comprising a computer readable medium 672 and an electronic data processing device 673, such as a microprocessor. The system further comprises a visual display unit 676, a computer keyboard 674 and a computer mouse 675 for entering data and activating virtual buttons visualized on the visual display unit 676. The visual display unit 676 can be a computer screen. The computer device 671 is capable of providing a predetermined distance between neighbor denture teeth, when the user performs transformation of a denture tooth, e.g. by loading information into the electronic data processing device 673, and of executing one or more computer implemented algorithms using said electronic data processing device: The algorithms are configured for providing that the distance between neighbor teeth in the 3D arrangement of denture teeth is provided as the predetermined distance.

The computer device 671 is further capable of receiving a digital 3D representation of the patient's upper and lower jaw, e.g. without any original teeth if the patient is edentulous, from a 3D scanning device 677, such as the TRIOS intra-oral scanner manufactured by 3shape TRIOS A/S, or capable of receiving scan data from such a 3D scanning device and forming a digital 3D representation of the patient's set of teeth based on such scan data. The received or formed digital 3D representation can be stored in the computer readable medium 672 and provided to the electronic data processing device 673.

When the user performs transformations of the denture teeth in the 3D arrangement of denture teeth, one or more options can be presented to the operator, such as which transformation should be performed, such as relocation, rotation etc, which denture tooth to transform, changing of different settings, such as the distance between the denture teeth after transformations. These options can be presented in a virtual environment visualized on the visual display unit 676.

The system comprises a unit 678 for transmitting the final 3D arrangement of denture teeth after transformations to e.g. a computer aided manufacturing (CAM) device 679 for manufacturing the denture, e.g. the single denture teeth, the whole set of denture teeth, the artificial gingival etc. to another computer system e.g. located at a milling center where the denture teeth are manufactured or at a denture centre where the denture is assembled. The unit for transmitting can be a wired or a wireless connection.

The 3D scanning of the patient's upper and lower jaw using the 3D scanning device 677 can be performed at a dentist while creating the denture at a dental laboratory. In such cases the digital 3D representation of the patient's upper and lower jaw can be provided via an internet connection between the dentist and the dental laboratory.

Figure 5:
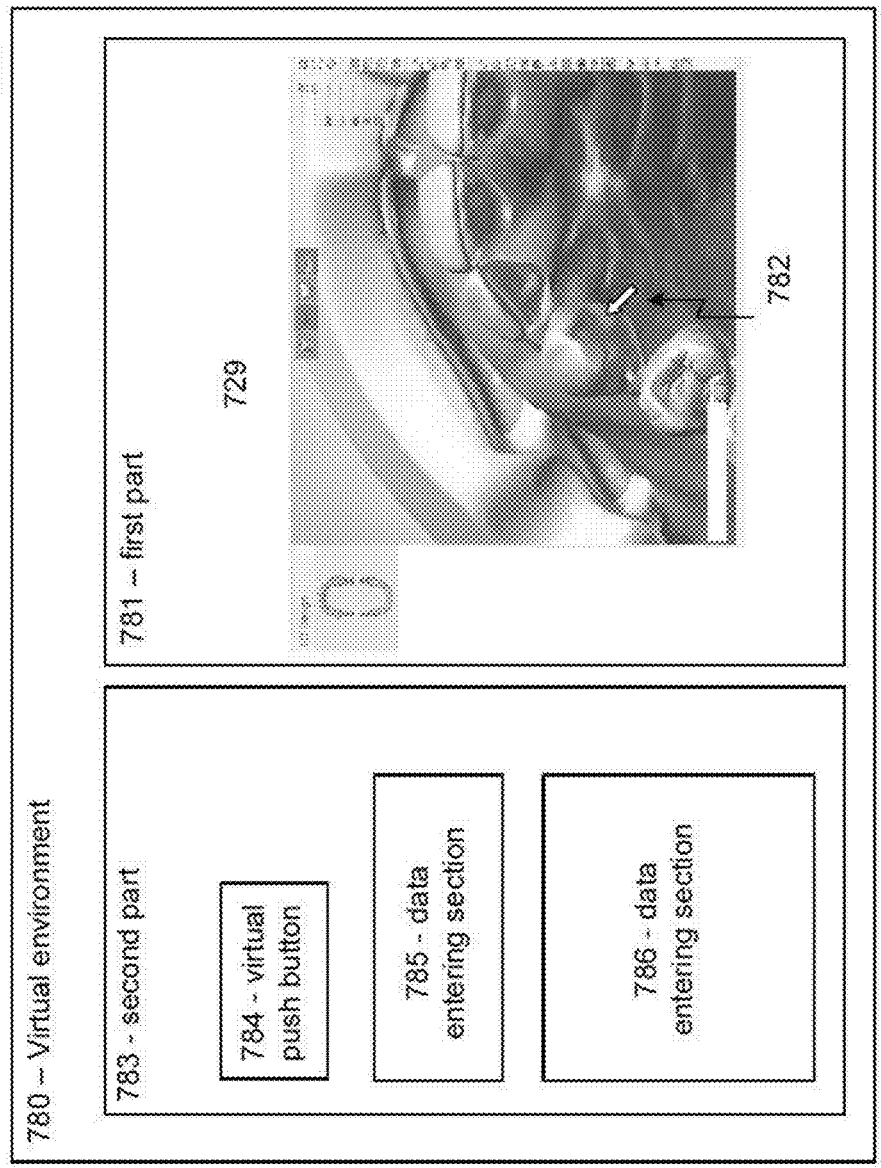
FIG. 5 shows a schematic example of a virtual environment according to an embodiment of the invention.

FIG. 5 shows a schematic example of a virtual environment according to an embodiment of the invention.

In FIG. 5 a first part 781 of the virtual environment 780 is seen in which an image 729 of the denture teeth provided with a predetermined distance between the denture teeth after the user's transformation. A virtual tool 782 can be used in marking or defining different features such as the denture tooth to be relocated. The virtual movement tool can be configured for grabbing the feature, e.g. the denture tooth and moving it in the virtual environment using e.g. a computer mouse.

The second part 783 of the virtual environment comprises data entering sections 785, 786 for entering various data relevant for the procedure, such as data relating to what the distance between the denture teeth should be.

A virtual push button 784 is configured for creating the relocation of neighbor denture teeth when the selected denture tooth is relocated. The virtual environment can be visualized on a visual display unit, such as a computer screen being part of a system configured for implementing the method according to the present invention.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

EMBODIMENTS

1. A method for digitally designing a denture for a patient, where the denture comprises a plurality of denture teeth, where designing the denture comprises transforming, such as relocating, repositioning and/or rotating, denture teeth of the denture, and where the denture teeth are grouped in at least two blocks where each block comprises at least two denture teeth, wherein the method comprises:
   obtaining a 3D scan of the upper jaw and lower jaw of the patient;
   obtaining a digital 3D arrangement of the denture teeth, where the denture teeth are pre-set in occlusion;
   digitally arranging the 3D scan of the upper jaw and lower jaw relative to the 3D arrangement of the denture teeth;
   digitally transforming at least one denture tooth based on input from a user; where at least one design rule is enforced that affect one or more, but not all of the blocks, when the at least one denture tooth is transformed.

2. A method according to embodiment 1, wherein the at least one design rule is selected from a group of independent design rules comprising:
   maintain occlusion with antagonist teeth in the block,
   maintain interproximal contact with neighboring teeth in the block.

3. A method according to embodiment 1 or 2, wherein the at least one design rule is selected from a group of dependent design rules comprising:
   maintain distance between at least one tooth from one block and at least one tooth from another block,
   maintain relative position of at least one tooth from one block with respect to a reference plane or reference line and the relative position of at least one tooth from another block with respect to the reference plane or reference line.

4. A method according to embodiment 3, wherein the reference plane is the midplane or midline.

5. A method according to any one of the embodiments 1-4, wherein the denture teeth are grouped in four blocks, comprising according to the ISO 3950 standard (FDI):—an upper anterior block comprising teeth 13, 12, 11, 21, 22, 23;
   a lower anterior block comprising teeth 43, 42, 41, 31, 32, 33;
   a left posterior block comprising at least teeth 24, 25, 26, 27, 34, 35, 36, 37; and
   a right posterior block comprising at least teeth 14, 15, 16, 17, 44, 45, 46, 47.

6. A method according to embodiment 5, wherein the upper anterior block is placed first, the left and right posterior blocks are placed second and the lower anterior block is placed third.

7. The method according to any one or more of the previous embodiments, wherein the pre-setup occlusion is maintained regardless of the transformations performed by the user.

8. A method according to any one of the embodiments 1-7, wherein the method further comprises:
   defining a predetermined distance between at least a number of neighbor denture teeth;
   providing the predetermined distance between the neighbor denture teeth, when the user digitally repositions a denture tooth in the virtual 3D arrangement of denture teeth.

9. A method for digitally designing a denture for a patient, where the denture comprises a plurality of denture teeth, where designing the denture comprises transforming, such as relocating, repositioning and/or rotating, denture teeth of the denture, wherein the method comprises:

obtaining a 3D scan of the upper jaw and lower jaw of the patient;

obtaining a digital 3D arrangement of the denture teeth, where the denture teeth are pre-set in occlusion;

digitally arranging the 3D scan of the upper jaw and lower jaw relative to the 3D arrangement of the denture teeth;

digitally grouping the denture teeth in four blocks, comprising according to the ISO 3950 standard (FDI):
  an upper anterior block comprising teeth 13, 12, 11, 21, 22, 23;
  a lower anterior block comprising teeth 43, 42, 41, 31, 32, 33;
  a left posterior block comprising at least teeth 24, 25, 26, 27, 34, 35, 36, 37; and
  a right posterior block comprising at least teeth 14, 15, 16, 17, 44, 45, 46, 47.

digitally placing the upper anterior block first, the left and right posterior blocks second and the lower anterior block third.

10. A method for virtually/digitally designing a denture for a patient, where the denture comprises a plurality of denture teeth, where designing the denture comprises transforming, such as relocating, repositioning and/or rotating, denture teeth of the denture, wherein the method comprises:

obtaining a 3D scan of the upper jaw and lower jaw of the patient;

obtaining/providing a virtual 3D arrangement of the denture teeth, where the denture teeth are pre-set in occlusion;

virtually arranging/providing the 3D scan of the upper jaw and lower jaw relative to the 3D arrangement of the denture teeth;

defining a predetermined distance between at least a number of neighbor denture teeth;

providing the predetermined distance between the neighbor denture teeth, when the user virtually repositions a denture tooth in the virtual 3D arrangement of denture teeth.

11. The method according to any one of the previous embodiments, wherein the repositioned denture tooth is snapped to an adjusted position.

12. The method according to any one of the previous embodiments, wherein one or more of the neighbor denture teeth is/are snapped to an adjusted position when the denture tooth is repositioned.

13. The method according any one of the previous embodiments, wherein the adjusted position of the denture tooth or teeth after transformation is determined based on a search optimization algorithm.

14. The method according to embodiment 10, 11, 12 or 13, wherein the search optimization algorithm is the Golden section search optimization.

15. The method according to any one of the previous embodiments, wherein the transformation of the denture teeth are restricted to specific directions.

16. The method according to any one of the previous embodiments, wherein the upper and lower anterior teeth in the virtual 3D arrangement of denture teeth are setup in occlusion separately from each other in arch-shaped blocks.

17. The method according to any one of the previous embodiments, wherein the denture teeth in the virtual 3D arrangement of denture teeth are split into three logical blocks, which are the upper and lower molars and premolars making a posterior block, an upper anterior teeth block, and a lower anterior teeth block.

18. The method according to any one of the previous embodiments, wherein the teeth blocks placement is performed by following arch-shaped mandibular and maxillary alveolar crests in an optimal way and taking into account other anatomical data, such as median, occlusal plane, and/or characteristic points.

19. The method according to any one of the previous embodiments, wherein the anterior blocks are placed first, and then the posterior blocks are placed, whereby the canines touch the first premolar teeth.

20. The method according to any one of the previous embodiments, wherein the shapes of the anterior blocks are changed by the user performing transformation to any tooth in the anterior blocks.

21. The method according to any one of the previous embodiments, wherein the predetermined distance between the teeth is selected from a group consisting of:
  the distance is zero, resulting in no distance between the teeth meaning the teeth are arranged with their proximal surfaces touching each other;
  the distance is positive, whereby there will be a distance between the teeth, i.e. their proximal surfaces do not touch each other;
  the distance is negative, resulting in protrusion, meaning that the teeth will overlap each other.

22. The method according to any one of the previous embodiments, wherein the adjusted position of the repositioned denture tooth is in a distal direction.

23. The method according to any one of the previous embodiments, wherein the adjusted positions of the repositioned neighbor denture teeth are in a distal direction.

24. The method according to any one of the previous embodiments, wherein the predetermined distance between the denture teeth is ensured by means of a post-movement operation progressing sequentially tooth by tooth in the distal direction.

25. The method according to any one of the previous embodiments, wherein if a gap has occurred between two neighbor denture teeth due to the user's performed transformations, the latter tooth is moved mesially thereby closing the gap ensuring that the predetermined distance between the teeth is obtained.

26. The method according to any one of the previous embodiments, wherein if the current distance between two denture neighbor teeth is less than the predetermined distance, the latter tooth is moved distally.

27. The method according to any one of the previous embodiments, wherein the shape of the posterior blocks is not adapted to be changed.

28. The method according to any one of the previous embodiments, wherein the position of the individual teeth in the posterior blocks is not adapted to be changed.

29. The method according to any one of the previous embodiments, wherein the posterior blocks are adapted to be moved and/or rotated in space.

30. The method according to any one of the previous embodiments, wherein the pre-setup occlusion is maintained regardless of the transformations performed by the user.

31. The method according to any one of the previous embodiments, wherein the distance between anterior blocks and posterior blocks is adapted to be maintained.
32. The method according to any one of the previous embodiments, wherein the whole posterior block is adapted to be moved distally if space for its placement is needed.
33. The method according to any one of the previous embodiments, wherein posterior blocks with a specific bite type is adapted to be defined separately for the left and for the right side of the mouth.
34. The method according to any one of the previous embodiments, wherein the method further comprises virtually arranging the 3D arrangement of the denture teeth relative to a wax rim of the patient.
35. The method according to any one of the previous embodiments, wherein the method further comprises virtually snapping the 3D arrangement of the denture teeth to the wax rim.
36. The method according to any one of the previous embodiments, wherein the position of the 3D arrangement of the denture teeth relative to the wax rim is determined by calculating the minimal distance between a predefined facial/vestibular point on each tooth and the wax rim.
37. The method according to any one of the previous embodiments, wherein the method comprises arranging the 3D arrangement of the denture teeth relative to the wax rim with a minimal distance between the facial/vestibular point on each denture tooth and points on the wax rim.
38. The method according to any one of the previous embodiments, wherein the minimal distance is calculated by means of a minimum distance estimation algorithm.
39. The method according to any one or more of the previous embodiments, wherein the method is computer implemented.
40. A computer program product comprising program code means for causing a data processing system to perform the method according to any one or more of the previous embodiments, when said program code means are executed on the data processing system, and a computer program product, comprising a computer-readable medium having stored there on the program code means.
41. A virtual design environment for designing a denture for a patient, where the denture comprises a plurality of denture teeth, where designing the denture comprises transforming, such as relocating, repositioning and/or rotating, denture teeth of the denture, wherein the virtual design environment comprises:
a virtual work space adapted for visualizing a 3D scan of the upper jaw and lower jaw of the patient and for visualizing a virtual 3D arrangement of the denture teeth, where the denture teeth are pre-set in occlusion;
a virtual arrangement tool for arranging or providing the 3D scan of the upper jaw and lower jaw relative to the 3D arrangement of the denture teeth;
a virtual definition tool for defining a predetermined distance between at least a number of neighbor denture teeth;
a virtual tool for providing the predetermined distance between the neighbor denture teeth, when the user virtually repositions a denture tooth in the virtual 3D arrangement of denture teeth.
42. The virtual design environment according to the previous embodiment, where the virtual arrangement tool and the virtual definition tool are provided as virtual buttons.
43. A nontransitory computer readable medium storing thereon a computer program, where said computer program is configured for causing computer-assisted designing of a denture for a patient, where the denture comprises a plurality of denture teeth, where designing the denture comprises transforming, such as relocating, repositioning and/or rotating, denture teeth of the denture.
44. A system for virtually designing a denture for a patient, where the denture comprises a plurality of denture teeth, where designing the denture comprises transforming, such as relocating, repositioning and/or rotating, denture teeth of the denture, wherein the system comprises:
means for obtaining a 3D scan of the upper jaw and lower jaw of the patient;
means for obtaining/providing a virtual 3D arrangement of the denture teeth, where the denture teeth are pre-set in occlusion;
means for virtually arranging/providing the 3D scan of the upper jaw and lower jaw relative to the 3D arrangement of the denture teeth;
means for defining a predetermined distance between at least a number of neighbor denture teeth;
means for providing the predetermined distance between the neighbor denture teeth, when the user virtually repositions a denture tooth in the virtual 3D arrangement of denture teeth.
45. The system according to the previous embodiment comprising a nontransitory computer readable medium having one or more computer instructions stored thereon, where said computer instructions comprises instructions for carrying out a method of virtually designing a denture for a patient, where the denture comprises a plurality of denture teeth, where designing the denture comprises transforming, such as relocating, repositioning and/or rotating, denture teeth of the denture, wherein the method comprises:
obtaining a 3D scan of the upper jaw and lower jaw of the patient;
obtaining/providing a virtual 3D arrangement of the denture teeth, where the denture teeth are pre-set in occlusion;
virtually arranging/providing the 3D scan of the upper jaw and lower jaw relative to the 3D arrangement of the denture teeth;
defining a predetermined distance between at least a number of neighbor denture teeth;
providing the predetermined distance between the neighbor denture teeth, when the user virtually repositions a denture tooth in the virtual 3D arrangement of denture teeth.

What is claimed is:
1. A method for digitally designing a denture for a patient and facilitating the manufacture of the denture, where the denture comprises a plurality of denture teeth, where digitally designing the denture includes digitally transforming denture teeth of the denture, wherein the method comprises:
obtaining a 3D scan of the upper jaw and lower jaw of the patient from a 3D scanner;

obtaining a digital 3D arrangement of the denture teeth, where the denture teeth are pre-set in occlusion;

digitally grouping the denture teeth in four groups, wherein each of the groups has a design rule, the four groups comprising:
  an upper anterior group;
  a lower anterior group;
  a left posterior group; and
  a right posterior group;

digitally arranging the four groups of denture teeth relative to the 3D scan of the upper jaw and lower jaw, digitally arranging the upper anterior group first, the left and right posterior groups second and the lower anterior group third;

receiving user input, via a user input interface, for digitally transforming at least one of the denture teeth in the upper anterior group to change a position of the tooth according to a user's plan, wherein the user input triggers an algorithm to determine whether the requested transformation complies with the design rule;

digitally transforming the at least one denture tooth based on the user input when the requested transformation complies with the design rule and saving the transformation of the at least one denture tooth;

in response to digitally transforming the at least one denture tooth based on the user input, using a computer to rely on the saved transformation of the at least one denture tooth to automatically transform all other teeth in the upper anterior group such that the all other teeth in the upper anterior group conform to the design rule applicable to the upper anterior group prior to transforming teeth in the other groups;

generating a final 3D arrangement of the denture teeth in a computer usable file format;

transmitting the final 3D arrangement of the denture teeth to a computer aided manufacturing device; and manufacturing the denture based on the final 3D arrangement.

2. The method according to claim 1, wherein the digital transforming includes relocating, repositioning or rotating.

3. The method according to claim 1, wherein the digital transforming includes relocating.

4. The method according to claim 1, wherein the digital transforming includes repositioning.

5. The method according to claim 1, wherein the digital transforming includes rotating.

6. The method according to claim 1, wherein the method includes, when the user input for digitally transforming the at least one of the denture teeth is released, the at least one of the denture teeth and the all other teeth are automatically snapped to a position to ensure that a predetermined distance is maintained between the teeth.

7. A method for digitally designing a denture for a patient and facilitating the manufacture of the denture, where the denture comprises a plurality of denture teeth, where designing the denture comprises transforming denture teeth of the denture, and where the denture teeth are grouped in at least two groups where each group comprises at least two denture teeth, and wherein each of the groups has at least one design rule that affects the group, wherein the method comprises:
  obtaining a 3D scan of the upper jaw and lower jaw of the patient from a 3D scanner;
  obtaining a digital 3D arrangement of the denture teeth, where the denture teeth are pre-set in occlusion;
  digitally arranging the 3D scan of the upper jaw and lower jaw relative to the 3D arrangement of the denture teeth;
  receiving user input, via a user input interface, for digitally transforming at least one of the denture teeth to change a position of the tooth according to a user's plan, wherein the user input triggers an algorithm to determine whether the requested transformation complies with the at least one design rule;
  digitally transforming the at least one denture tooth in one of the groups based on the user input when the requested transformation complies with the at least one design rule and saving the transformation of the at least one denture tooth;
  in response to digitally transforming the at least one denture tooth based on the user input, using a computer to rely on the saved transformation of the at least one denture tooth to automatically transform all other teeth in the one group such that the all other teeth conform to the at least one design rule applicable to the one group; and
  generating a final 3D arrangement of the denture teeth in a computer usable file format;
  transmitting the final 3D arrangement of the denture teeth to a computer aided manufacturing device; and
  manufacturing the denture based on the final 3D arrangement.

8. The method according to claim 7, wherein the digital transforming includes relocating, repositioning or rotating.

9. The method according to claim 7, wherein the digital transforming includes relocating.

10. The method according to claim 7, wherein the digital transforming includes repositioning.

11. The method according to claim 7, wherein the digital transforming includes rotating.

12. The method according to claim 7, wherein the method includes, when the user input for digitally transforming the at least one of the denture teeth is released, the at least one of the denture teeth and the all other teeth are automatically snapped to a position to ensure that a predetermined distance is maintained between the teeth.

* * * * *